(12) United States Patent
Elkader et al.

(10) Patent No.: US 10,782,767 B1
(45) Date of Patent: Sep. 22, 2020

(54) SYSTEM, METHOD, AND COMPUTER PROGRAM PRODUCT FOR CLOCK GATING IN A FORMAL VERIFICATION

(71) Applicant: Cadence Design Systems, Inc., San Jose, CA (US)

(72) Inventors: Karam Abd Elkader, Taybe (IL); Doron Bustan, Zichron Yaakov (IL); Habeeb Farah, Nazareth (IL); Yaron Schiller, Petach Tikva (IL)

(73) Assignee: Cadence Design Systems, Inc., San Jose, CA (US)

( * ) Notice: Subject to any disclaimer, the term of this patent is extended or adjusted under 35 U.S.C. 154(b) by 156 days.

(21) Appl. No.: 16/176,645

(22) Filed: Oct. 31, 2018

(51) Int. Cl.
  *G06F 1/00* (2006.01)
  *G06F 1/3237* (2019.01)
(52) U.S. Cl.
  CPC .................. *G06F 1/3237* (2013.01)
(58) Field of Classification Search
  CPC ..................................... G06F 1/3237
  See application file for complete search history.

(56) References Cited

U.S. PATENT DOCUMENTS

| | | | | |
|---|---|---|---|---|
| 4,517,673 A | * | 5/1985 | Brown | G06F 11/16 714/10 |
| 5,523,792 A | * | 6/1996 | Ciardi | H04N 7/0102 348/505 |
| 6,208,184 B1 | * | 3/2001 | Demicheli | G11B 20/10009 327/161 |
| 2006/0005091 A1 | * | 1/2006 | Mitra | G01R 31/31816 714/726 |
| 2008/0028343 A1 | * | 1/2008 | Sato | G06F 30/392 326/93 |
| 2009/0121682 A1 | * | 5/2009 | Goto | H01M 10/425 320/134 |
| 2010/0001703 A1 | * | 1/2010 | Williams | H02M 3/1584 323/283 |
| 2010/0001704 A1 | * | 1/2010 | Williams | H02M 3/157 323/283 |
| 2010/0045332 A1 | * | 2/2010 | Mizuno | G01R 31/3187 324/750.3 |
| 2017/0344682 A1 | * | 11/2017 | Wilson | G06F 30/327 |

* cited by examiner

*Primary Examiner* — Mohammed H Rehman
(74) *Attorney, Agent, or Firm* — Mark H. Whittenberger, Esq.; Holland & Knight LLP

(57) ABSTRACT

The present disclosure relates to a method for reducing power consumption. Embodiments include providing an electronic design of a device under test having a plurality of flip-flops associated therewith. Embodiments also include selecting a first set of flip-flops from the plurality of flip-flops and disabling a first clock associated with the first set of flip-flops without changing a value of the first set of flip-flops. Embodiments may further include selecting a second set of flip-flops from the plurality of flip-flops and disabling a second clock associated with the second set of flip-flops without changing a value of the second set of flip-flops. Embodiments may further include determining whether a first output from the first set of flip-flops and a second output from the second set of flip-flops have converged.

17 Claims, 8 Drawing Sheets

SYSTEM, METHOD, AND COMPUTER PROGRAM PRODUCT FOR CLOCK GATING IN A FORMAL VERIFICATION

TECHNICAL FIELD

The present disclosure relates to electronic design verification, and more specifically, to a method for clock gating in a formal verification.

DISCUSSION OF THE RELATED ART

In the context of hardware and software systems, formal verification generally refers to proving or disproving the correctness of intended algorithms underlying a system with respect to a certain formal specification or property, using formal methods of mathematics. A formal equivalence checking process is a part of electronic design automation (EDA), commonly used during the development of digital integrated circuits, to formally prove that two representations of a circuit design exhibit exactly the same behavior.

SUMMARY OF DISCLOSURE

In one or more embodiments of the present disclosure, a computer-implemented method for reducing power consumption may include providing an electronic design of a device under test having a plurality of flip-flops associated therewith. The method may also include selecting a first set of flip-flops from the plurality of flip-flops and disabling a first clock associated with the first set of flip-flops without changing a value of the first set of flip-flops. The method may further include selecting a second set of flip-flops from the plurality of flip-flops and disabling a second clock associated with the second set of flip-flops without changing a value of the second set of flip-flops. The method may further include determining whether a first output from the first set of flip-flops and a second output from the second set of flip-flops have converged.

One or more of the following features may be included. In some embodiments, partitioning the first clock associated with the first set of flip-flops into a plurality of cascaded clocks. In some embodiments, determining whether the first output from the first set of flip-flops and the second output from the second set of flip-flops have converged occurs after the partitioning. The first set of flip-flops and the second set of flip flops may each include dedicated enable logic and disable logic. Disabling the first clock may include setting the first clock as a quasi-static variable. Disabling the second clock may include setting the second clock as a quasi-static variable. If it is determined that the first output from the first set of flip-flops and the second output from the second set of flip-flops have not converged, the method may include partitioning one or more additional clocks associated with the first set of flip-flops into one or more additionally cascaded clocks.

In one or more embodiments of the present disclosure a computer-readable storage medium having stored thereon instructions, which when executed by a processor result in one or more operations is provided. Operations may include providing an electronic design of a device under test having a plurality of flip-flops associated therewith. Operations may also include selecting a first set of flip-flops from the plurality of flip-flops and disabling a first clock associated with the first set of flip-flops without changing a value of the first set of flip-flops. Operations may further include selecting a second set of flip-flops from the plurality of flip-flops and disabling a second clock associated with the second set of flip-flops without changing a value of the second set of flip-flops. Operations may further include determining whether a first output from the first set of flip-flops and a second output from the second set of flip-flops have converged.

One or more of the following features may be included. In some embodiments, partitioning the first clock associated with the first set of flip-flops into a plurality of cascaded clocks. In some embodiments, determining whether the first output from the first set of flip-flops and the second output from the second set of flip-flops have converged occurs after the partitioning. The first set of flip-flops and the second set of flip flops may each include dedicated enable logic and disable logic. Disabling the first clock may include setting the first clock as a quasi-static variable. Disabling the second clock may include setting the second clock as a quasi-static variable. If it is determined that the first output from the first set of flip-flops and the second output from the second set of flip-flops have not converged, operations may include partitioning one or more additional clocks associated with the first set of flip-flops into one or more additionally cascaded clocks.

In one or more embodiments of the present disclosure, a system for reducing power consumption is provided. The system may include one or more processors configured to provide an electronic design of a device under test having a plurality of flip-flops associated therewith. The system may include one or more processors configured to select a first set of flip-flops from the plurality of flip-flops and disabling a first clock associated with the first set of flip-flops without changing a value of the first set of flip-flops. The system may include one or more processors configured to select a second set of flip-flops from the plurality of flip-flops and disabling a second clock associated with the second set of flip-flops without changing a value of the second set of flip-flops. The system may include one or more processors configured to determine whether a first output from the first set of flip-flops and a second output from the second set of flip-flops have converged.

One or more of the following features may be included. In some embodiments, partitioning the first clock associated with the first set of flip-flops into a plurality of cascaded clocks. In some embodiments, determining whether the first output from the first set of flip-flops and the second output from the second set of flip-flops have converged occurs after the partitioning. The first set of flip-flops and the second set of flip flops may each include dedicated enable logic and disable logic. Disabling the first clock may include setting the first clock as a quasi-static variable. Disabling the second clock may include setting the second clock as a quasi-static variable. If it is determined that the first output from the first set of flip-flops and the second output from the second set of flip-flops have not converged, the system may include partitioning one or more additional clocks associated with the first set of flip-flops into one or more additionally cascaded clocks.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
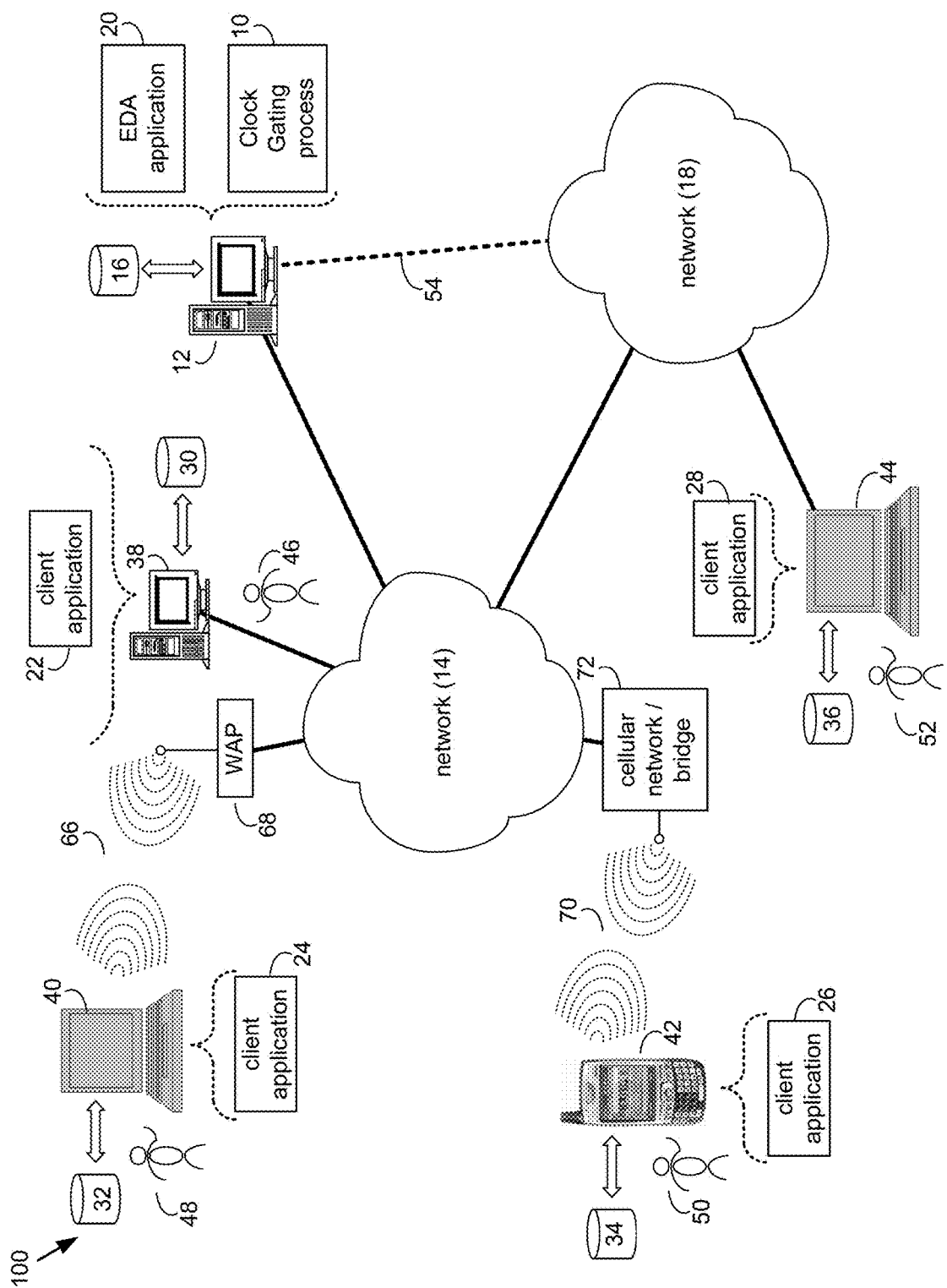
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown a clock gating process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example: (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, clock gating process 10 may reside on and be executed, in whole or in part, by a client electronic device, such as a personal computer, notebook computer, personal digital assistant, or the like.

The instruction sets and subroutines of clock gating process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Clock gating process 10 may be a stand alone application, or may be an applet/application/script that may interact with and/or be executed within EDA application 20. In addition/as an alternative to being a server-side process, clock gating process 10 may be a client-side process (not shown) that may reside on a client electronic device (described below) and may interact with an EDA client application (e.g., one or more of EDA client applications 22, 24, 26, 28). Further, clock gating process 10 may be a hybrid server-side/client-side process that may interact with EDA application 20 and an EDA client application (e.g., one or more of client applications 22, 24, 26, 28). As such, clock gating process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize clock gating process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
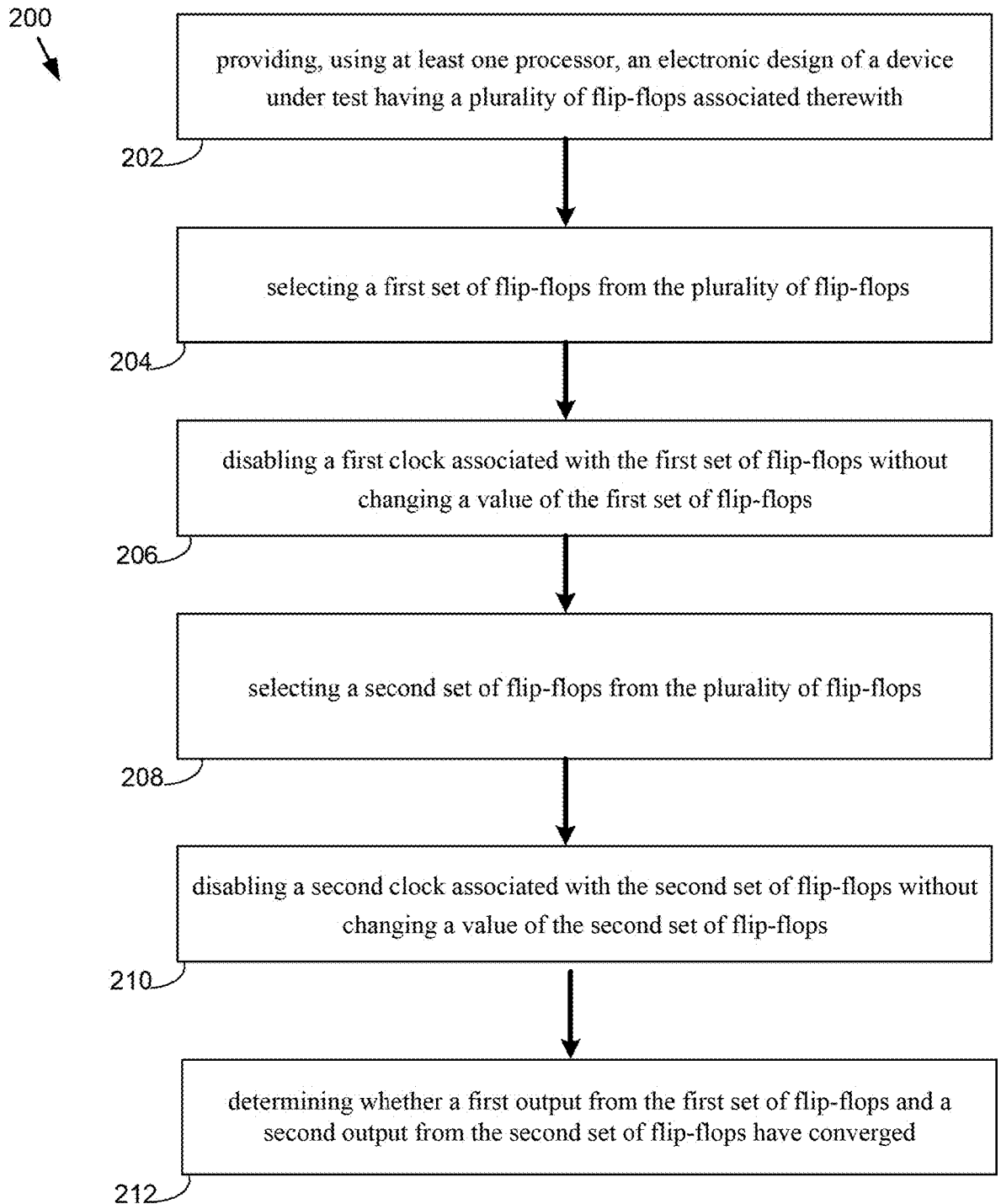
FIG. 2 is a flowchart depicting operations consistent with the clock gating process in accordance with an embodiment of the present disclosure.

Referring now to FIG. 2, an exemplary flowchart 200 depicting operations consistent with clock gating process 10 is provided. Clock gating process 10 may include providing (202) an electronic design of a device under test having a plurality of flip-flops associated therewith. Embodiments also include selecting (204) a first set of flip-flops from the plurality of flip-flops and disabling (206) a first clock associated with the first set of flip-flops without changing a value of the first set of flip-flops. Embodiments may further include selecting (208) a second set of flip-flops from the plurality of flip-flops and disabling (210) a second clock associated with the second set of flip-flops without changing a value of the second set of flip-flops. Embodiments may further include determining (212) whether a first output from the first set of flip-flops and a second output from the second set of flip-flops have converged.

Figure 3:
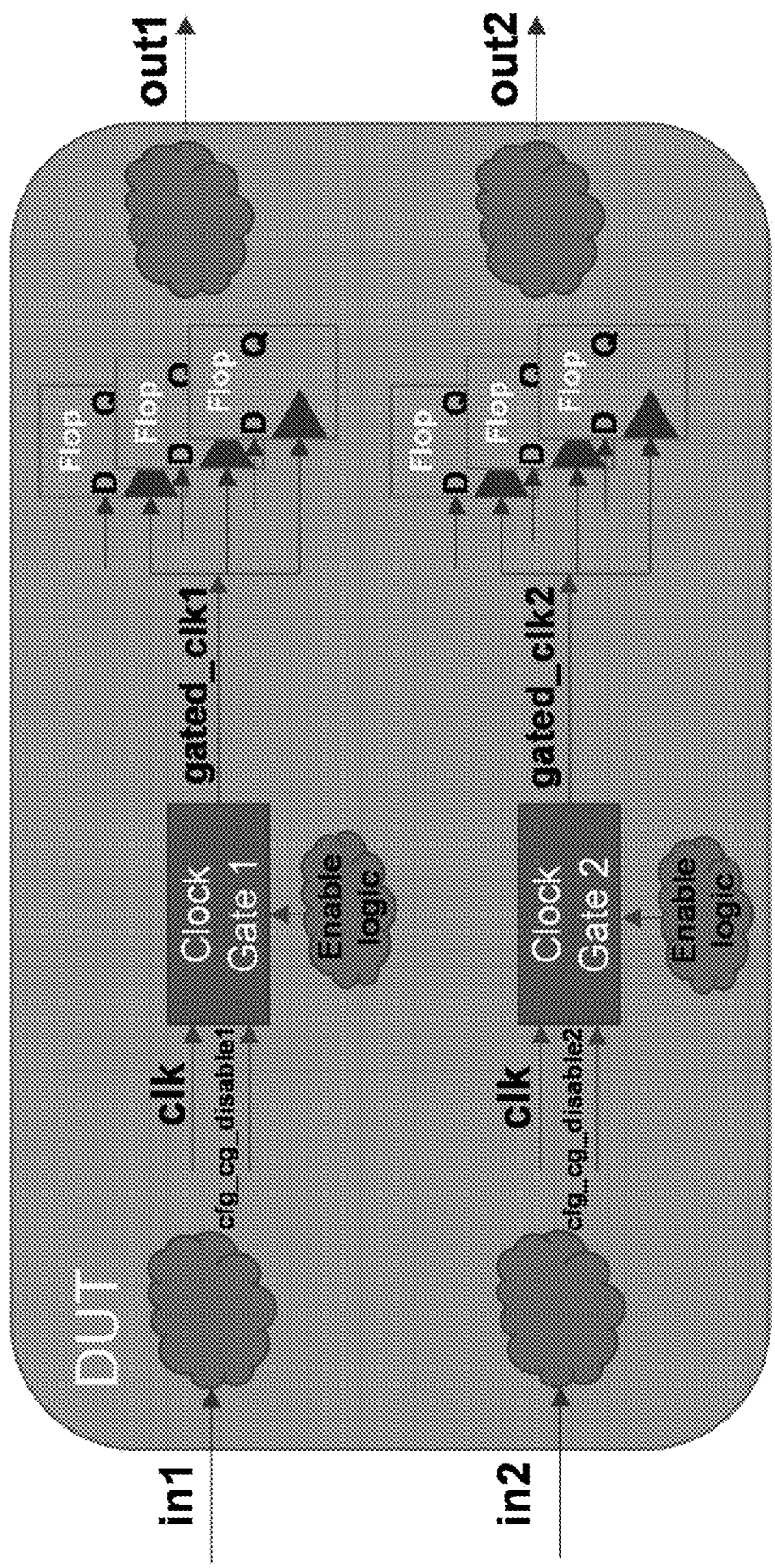
FIG. 3 is a diagram depicting an embodiment of an example in accordance with the present disclosure.
Figure 4:
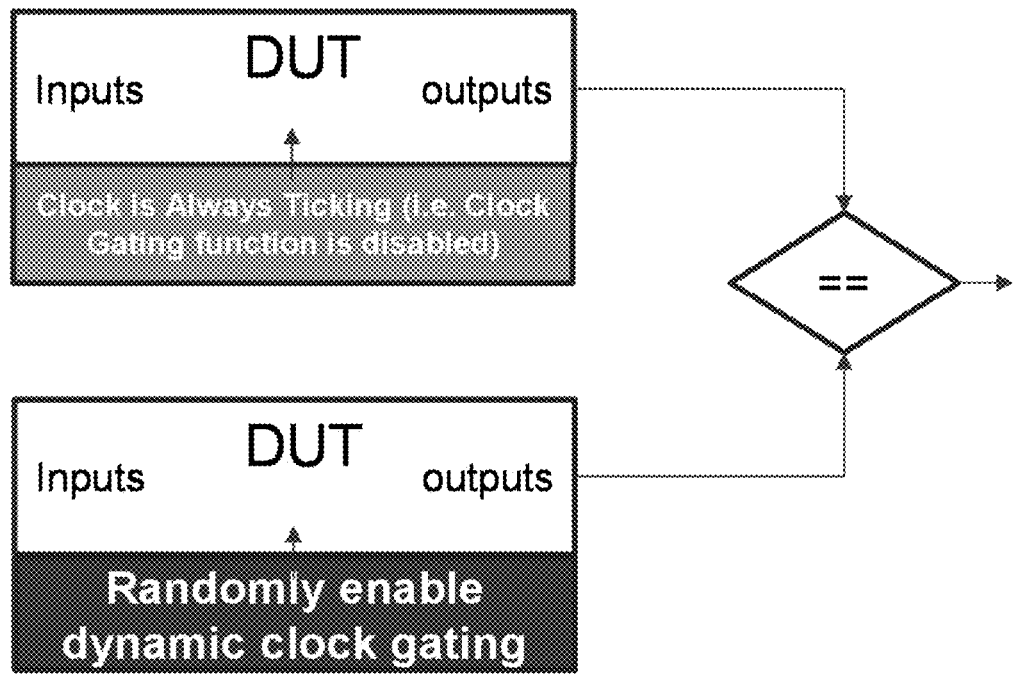
FIG. 4 is a diagram depicting an embodiment of an example in accordance with the present disclosure.

Referring now to FIGS. 3-4, embodiments of clock gating process 10 may be configured to solve the problem of proving a clock gating methodology. More particularly, embodiments may be used to prove that the output functional behavior of a particular device-under-test ("DUT") is not dependent on the clock gating cells setting (another approach may involve checking that the DUT, when all of its clock gating cells are enabled, behaves the same as when all of its clock gate cells are disabled). FIG. 3 shows an example DUT 300 having two clock gates cells, each having its own enable and disable logic. The output of the clock gate may be provided to a series of flip-flops. In the particular example of FIG. 3, it may be necessary to prove that the DUT output functional behavior is not dependent on the cfg_cg_disable* values. As such, for each set of stimuli vectors of in* signals shown in FIG. 3, clock gating process 10 may check that the out* signals behave the same regardless of which clock gating cells are enabled or bypassed. It should be noted that the cfg_cg_disable* signals are quasi-static that when set, allow to disable the clock gating functionality.

In some embodiments, an example equivalence problem which requires solving is provided. This problem may be addressed using sequential equivalence formal tools as shown in FIG. 4. In some embodiments, these may create a dual model, where one side is the DUT with its clock gating scheme disabled, and the other is the same DUT with its clock gating scheme enabled. Proving that the outputs of both models are equivalent, proves that the clock gating scheme has no functional implication on the DUT. In operation, the system may compare the two configurations of the design and one of the clocks may always be enabled. The other clock may have an arbitrary configuration (e.g., a stable enable/disable state). The arbitrary configuration may include a model with quasi-static signals.

Embodiments of clock gating process 10 may utilize cascading techniques, which are configured to gradually prove the equivalence problem. Accordingly, instead of proving one equivalence, embodiments included herein may be configured to partition the problem to several sub-equivalence problems. The fundamental concept behind this is to be able to perform the following: A==B, may be achieved by proving that A is equivalent to C and B is equal to C or A==C==B--->A==B.

Referring again to FIG. 3, an example consistent with embodiments of the present disclosure is provided. In the DUT of FIG. 3, there is a first equivalence problem. Namely, DUT with all cfg_cg_disable are TRUE ($DUT_A$) compared against the same DUT with only cfg_cg_disable1 set as a quasi-static variable (i.e. constant random) while cfg_cg_disable2 is TRUE ($DUT_C$). The second equivalence problem may then involve proving that $DUT_C$ is equivalent to a model with both cfg_cg_disable signals set as quasi-static variables ($DUT_B$) and then constraining $DUT_C$.cfg_cg_disable1 to be equal to $DUT_B$.cfg_cg_disable1.

Figure 5:
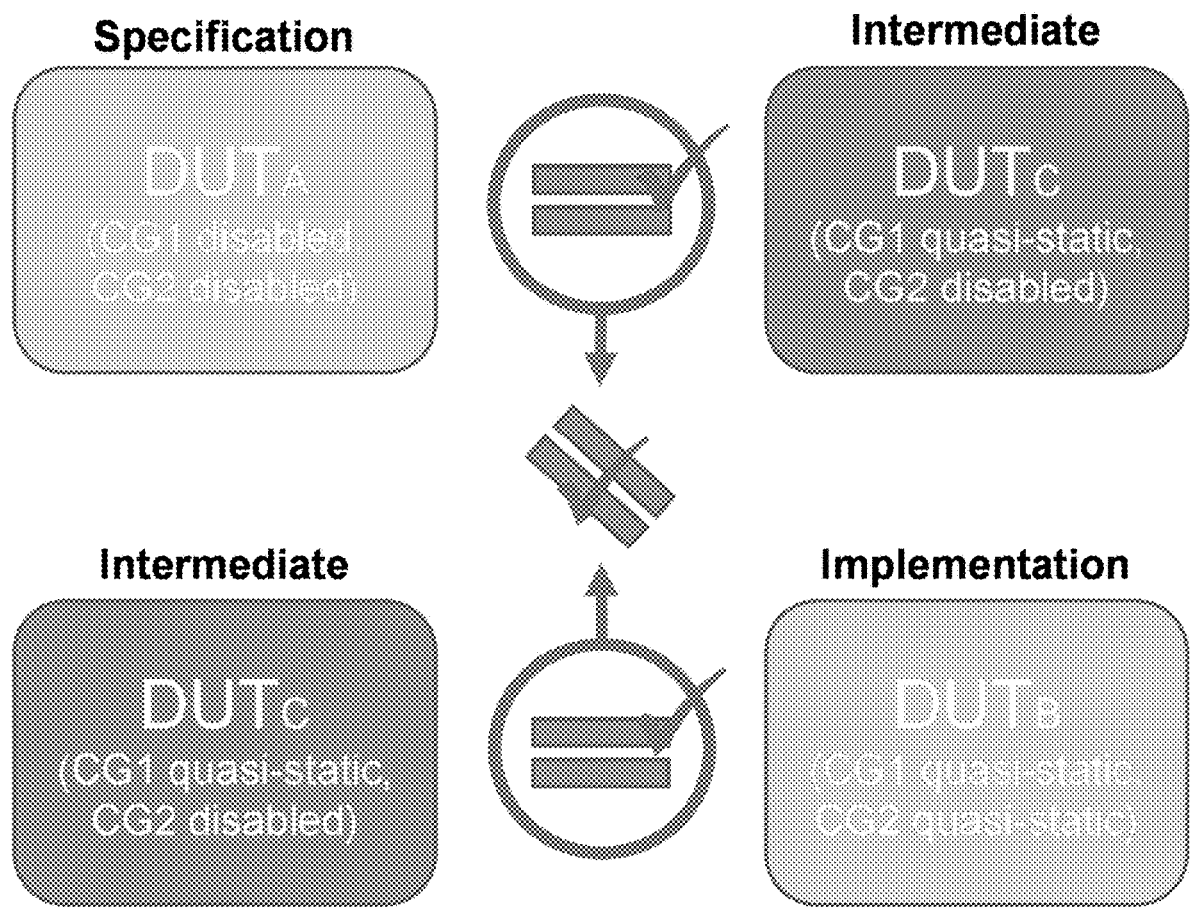
FIG. 5 is a diagram depicting an embodiment of an example in accordance with the present disclosure.

Referring also to FIG. 5, an embodiment of clock gating process 10 showing cascading is provided. FIG. 5 depicts a high level block diagram showing an example of cascading (e.g., proving several equivalence problems (which are supposed to be easier) results in proving the original problem). In this example, proving the two equivalence problems, namely, $DUT_A$==$DUT_C$ and $DUT_C$==$DUT_B$ may result in proving the original problem which is $DUT_A$==$DUT_B$. In some embodiments, it may be easier to prove the two previously mentioned equivalence problems rather than the original problem. This is because the less difference there is between the models makes the verification task easier. For example, less internal non-equivalences create more similarities of the models. In this way, formal verification techniques can take advantage of the increased similarity of the two models to converge faster. There may be fewer internal non-equivalences as there is more functional correlation between the two DUTs in the sub equivalence problems, for example, there may be fewer flops with different clock pin behavior (as we have less un-correlated clock gate cells between both designs).

Figure 6:
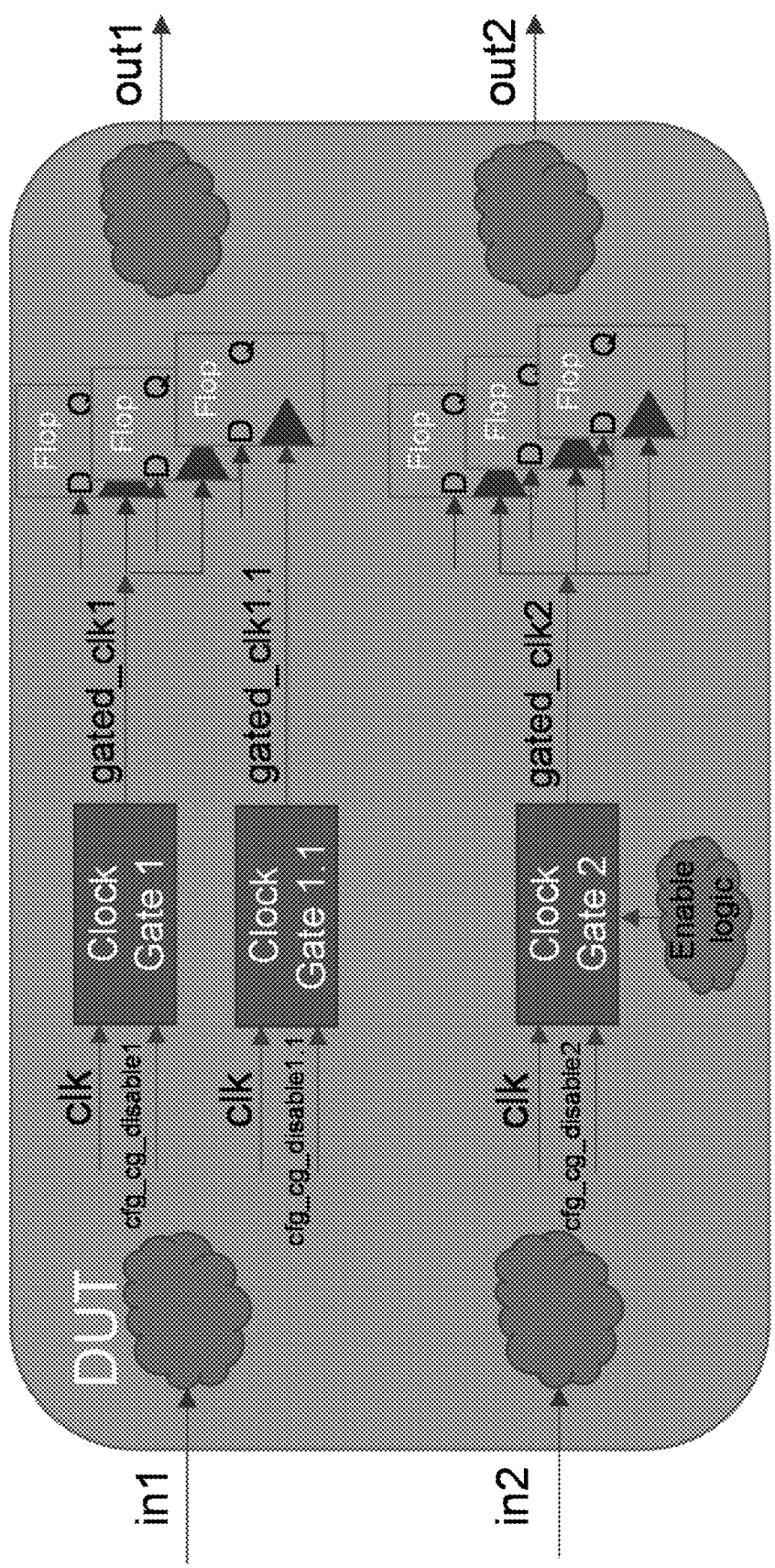
FIG. 6 is a diagram depicting an embodiment of an example in accordance with the present disclosure.

Often, proving equivalence between two configurations that differ in a single cg_disable signal may be difficult for the tool. Accordingly, and referring now to FIG. 6, embodiments of clock gating process 10 may be configured to artificially split the set of flops controlled by this cg_disable signal into several sets and to add new dedicated cg_disable signals for the new "artificial" sets. The terms "artificial" or "synthetic", as used herein, may refer to a manipulation of the DUT which is mutating it into a model that may provide a capability to create smaller cascading steps that may be more likely to converge. The DUT mutation does not damage or break the generalization of the complete solution/proof (but only adds more steps that require proving).

Embodiments of clock gating process 10 may use the new partitions to perform a finer cascading process. In this way, the artificial partitioning of clock gate 1 shown in FIG. 6, may increase the performance gain of the cascading process, by having finer differentiated equivalence problems in certain situations (e.g., when the sub-equivalence problem is still hard to prove).

In some embodiments, the artificial partitioning and cascading of clock gating process 10, may provide a better understanding of the clock gating mechanics. For example, in situations where sub-equivalence problems do not converge, the user may be provided with a set of flops, which by removing them of the gating effect on their clock pin, may provide a fully converging DUT model (e.g., a model where it is known that the clock gating has no functional implication on the DUT outputs). This can be regarded as a sign-off metric for the clock gating verification process.

Figure 7:
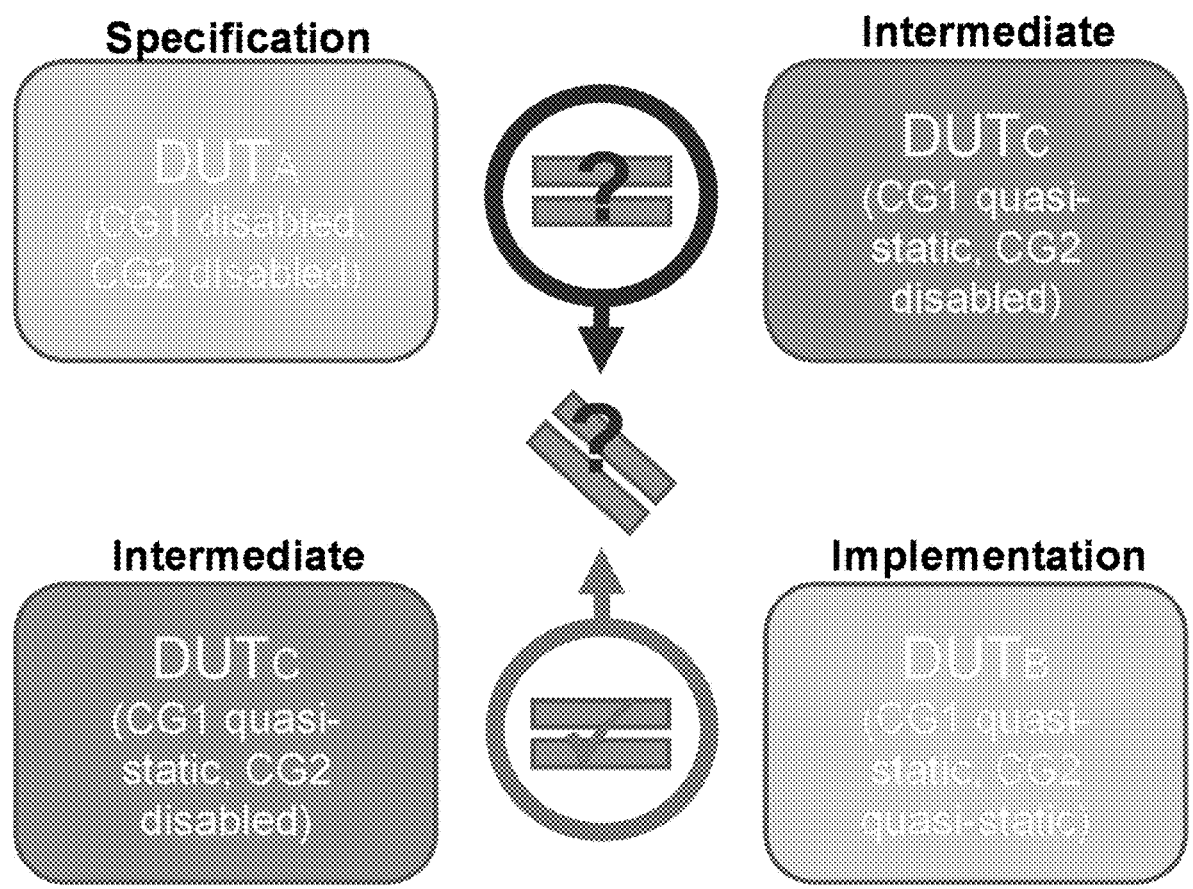
FIG. 7 is a diagram depicting an embodiment of an example in accordance with the present disclosure.

Referring now to FIG. 7, another embodiment consistent with clock gating process 10 is provided. In the event it is only possible to prove $DUT_B$ equals $DUT_C$, we can state that given that only the set of flops associated with the gated clock output of the CG2 cell instance, are gated, than the clock gating functionality is seamless to the DUT. We cannot say the same for the flops associated with CG1 cell instance clock output.

Figure 8:
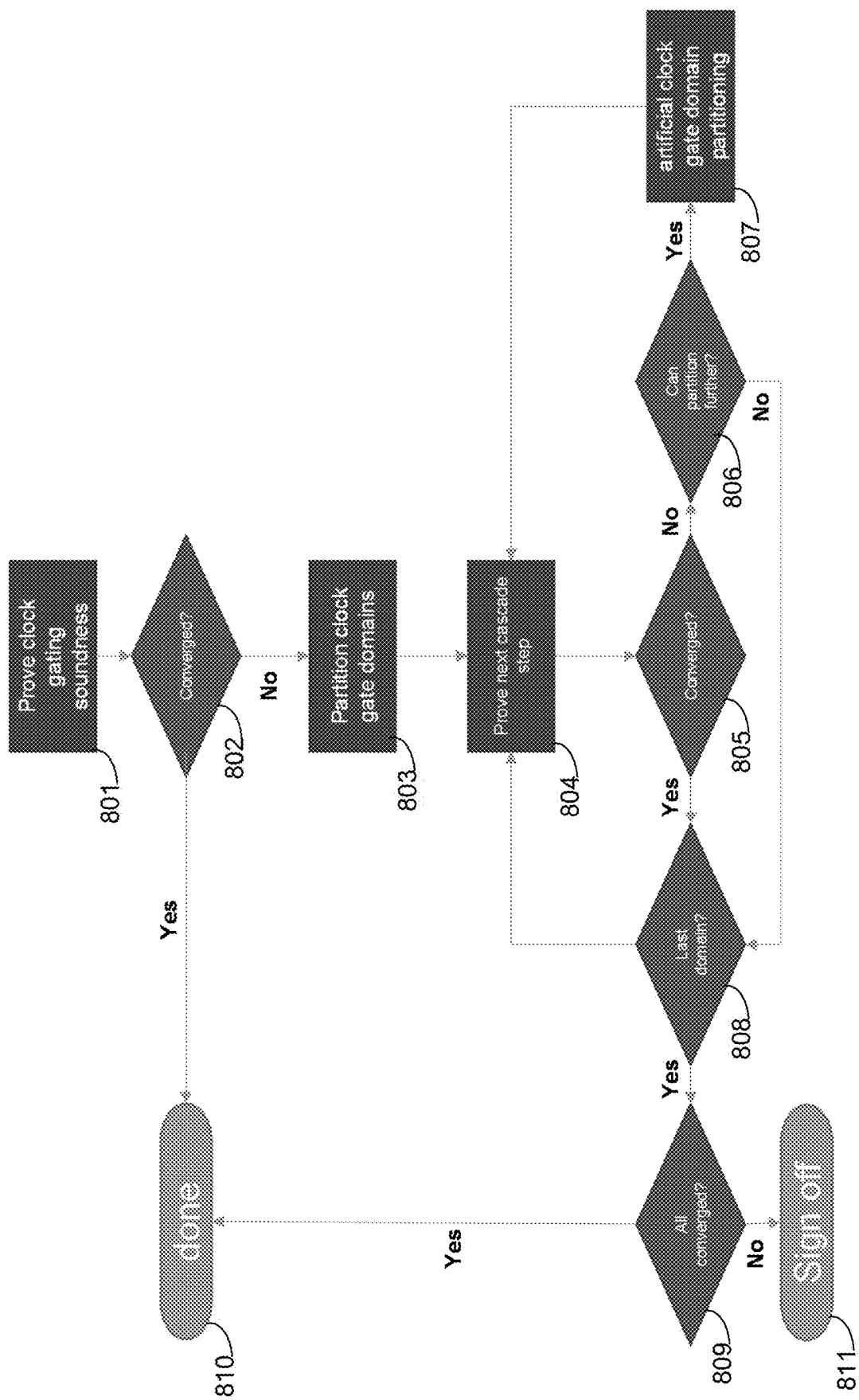
FIG. 8 is a flowchart depicting operations consistent with the clock gating process in accordance with an embodiment of the present disclosure.

Referring now to FIG. 8, a flowchart 800 showing operations consistent with the present disclosure is provided. The process may begin with a full proof attempt of the equivalence problem (801). If convergence is achieved, the process ends (810). If not, the process may partition (803) the clock gate domains and feed these partitions to the cascading proof, starting proving each cascade step (which is corresponding to a specific clock gate domain) at a time (804). The process may cascade steps which do not converge (805) through a process of creating "artificial" sets of clock gated flops (807), by partitioning the non-converging cascade step related domain, into several new domains, as described in FIG. 6 above. For each there may be a separate cascade stage proof, which may be simpler than the non-converging one. The non-converging clock gate domain proof will be replaced by these newly created domains (operation 804 may be repeated for these new domains instead of the non-converging one). The process may continue to partition non-converging domains until the partitioning is no longer possible (operations 804-807) (e.g., the domain is including only a single flop). If all cascade steps converged (809) full convergence has been achieved (810). If not, we need to provide a sign off (811) metric.

Embodiments of the present disclosure provide numerous advantages over existing approaches. Accordingly, embodiments of clock gating process 10 may be configured to break down a hard non-converging problem into smaller manageable proof steps (complexity is not linear in nature, but more of exponential in nature, therefor, the smaller proof stages may be aggregately easier to prove). This process may also be referred to as hierarchical clock gating verification due to its basic operation of breaking clock gate hierarchies. The process may be configured to provide a new sign off metric to a user to assist in deciding on a course of action when full convergence is not possible to achieve.

As described above, embodiments of clock gating process 10 may be configured to utilize clock gate cascading techniques in order to perform partitioning of the clock gate equivalence problem. Thus, creating a series of smaller or simpler equivalence problems with a higher likelihood to converge. The convergence of all of the cascade chain equivalences, proves the original equivalence problem. The partitioning process may be made even more granular by mutating the design, while not harming the final equivalence result. In addition, it is possible, using embodiments of the present disclosure, to extract a set of sequential signals which by removing the gating effect on their clock pins, may fully prove the clock gating problem. In some embodiments, for example where the size of this set is small enough, a user may be inclined to update his/her RTL to ensure the functional safety of his clock gating functionality.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in an electronic design automation formal equivalence checking process comprising:
   providing, using at least one processor, an electronic design of a device under test associated with the formal equivalence checking process, the device under test having a plurality of flip-flops associated therewith;
   selecting a first set of flip-flops from the plurality of flip-flops;
   disabling a first clock associated with the first set of flip-flops without changing a value of the first set of flip-flops;
   selecting a second set of flip-flops from the plurality of flip-flops;
   disabling a second clock associated with the second set of flip-flops without changing a value of the second set of flip-flops;
   determining whether a first output from the first set of flip-flops and a second output from the second set of flip-flops have converged; and
   partitioning the first clock associated with the first set of flip-flops into a plurality of cascaded clocks, wherein each of the plurality of cascaded clocks corresponds to a specific clock domain.

2. The computer-implemented method of claim 1, wherein determining whether the first output from the first set of flip-flops and the second output from the second set of flip-flops have converged occurs after the partitioning.

3. The computer-implemented method of claim 1, wherein the first set of flip-flops and the second set of flip flops each included dedicated enable logic and disable logic.

4. The computer-implemented method of claim 1, wherein disabling the first clock includes setting the first clock as a quasi-static variable.

5. The computer-implemented method of claim 1, wherein disabling the second clock includes setting the second clock as a quasi-static variable.

6. The computer-implemented method of claim 1, further comprising:
   if it is determined that the first output from the first set of flip-flops and the second output from the second set of flip-flops have not converged, partitioning one or more additional clocks associated with the first set of flip-flops into one or more additionally cascaded clocks.

7. A non-transitory computer-readable storage medium for use in an electronic design automation formal equivalence checking process, the computer-readable storage medium having stored thereon instructions that when executed by a machine result in one or more operations, the operations comprising:
   providing, using at least one processor, an electronic design of a device under test associated with the formal equivalence checking process, the device under test having a plurality of flip-flops associated therewith;

selecting a first set of flip-flops from the plurality of flip-flops;

disabling a first clock associated with the first set of flip-flops without changing a value of the first set of flip-flops;

selecting a second set of flip-flops from the plurality of flip-flops;

disabling a second clock associated with the second set of flip-flops without changing a value of the second set of flip-flops;

determining whether a first output from the first set of flip-flops and a second output from the second set of flip-flops have converged; and partitioning the first clock associated with the first set of flip-flops into a plurality of cascaded clocks, wherein each of the plurality of cascaded clocks corresponds to a specific clock domain.

8. The computer-readable storage medium of claim 7, wherein determining whether the first output from the first set of flip-flops and the second output from the second set of flip-flops have converged occurs after the partitioning.

9. The computer-readable storage medium of claim 7, wherein the first set of flip-flops and the second set of flip flops each included dedicated enable logic and disable logic.

10. The computer-readable storage medium of claim 7, wherein disabling the first clock includes setting the first clock as a quasi-static variable.

11. The computer-readable storage medium of claim 7, wherein disabling the second clock includes setting the second clock as a quasi-static variable.

12. The computer-readable storage medium of claim 7, further comprising:

if it is determined that the first output from the first set of flip-flops and the second output from the second set of flip-flops have not converged, partitioning one or more additional clocks associated with the first set of flip-flops into one or more additionally cascaded clocks.

13. A system for use in an electronic design automation formal equivalence checking process comprising:

a computing device having at least one processor configured to provide, using at least one processor, an electronic design of a device under test associated with the formal equivalence checking process, the device under test having a plurality of flip-flops associated therewith, the at least one processor further configured to select a first set of flip-flops from the plurality of flip-flops and to disable a first clock associated with the first set of flip-flops without changing a value of the first set of flip-flops, the at least one processor further configured to select a second set of flip-flops from the plurality of flip-flops and to disable a second clock associated with the second set of flip-flops without changing a value of the second set of flip-flops, the at least one processor further configured to determine whether a first output from the first set of flip-flops and a second output from the second set of flip-flops have converged, the at least one processor further configured to partition the first clock associated with the first set of flip-flops into a plurality of cascaded clocks, wherein each of the plurality of cascaded clocks corresponds to a specific clock domain.

14. The system of claim 13, wherein determining whether the first output from the first set of flip-flops and the second output from the second set of flip-flops have converged occurs after the partitioning.

15. The system of claim 13, wherein the first set of flip-flops and the second set of flip flops each included dedicated enable logic and disable logic.

16. The system of claim 13, wherein disabling the first clock includes setting the first clock as a quasi-static variable.

17. The system of claim 13, wherein disabling the second clock includes setting the second clock as a quasi-static variable.

* * * * *